United States Patent [19]

Kindermann et al.

[11] Patent Number: 5,066,041
[45] Date of Patent: Nov. 19, 1991

[54] CONTROL SYSTEM FOR STABILIZING THE ROLLING OF A VEHICLE

[75] Inventors: Siegfried Kindermann, Karlsfeld; Emil Györy; Hans Heiland, both of München, all of Fed. Rep. of Germany

[73] Assignee: Bayerische Motoren Werke AG, Munich, Fed. Rep. of Germany

[21] Appl. No.: 642,553

[22] Filed: Jan. 18, 1991

Related U.S. Application Data

[63] Continuation of Ser. No. 371,730, Jun. 27, 1989, abandoned.

[30] Foreign Application Priority Data

Jun. 27, 1987 [DE] Fed. Rep. of Germany ....... 3821610

[51] Int. Cl.⁵ ............................................. B60G 17/015
[52] U.S. Cl. ..................................... 280/772; 280/689; 280/707; 364/424.05
[58] Field of Search ................. 280/707, DIG. 1, 772, 280/689; 364/424.05

[56] References Cited

U.S. PATENT DOCUMENTS 4,712,807 12/1987 Kurasawa ........................ 364/424.05
4,761,022 8/1988 Ohashi .................................. 280/772

FOREIGN PATENT DOCUMENTS 0106697 4/1984 European Pat. Off. ............ 280/707
2844413 4/1980 Fed. Rep. of Germany .
0106127 5/1988 Japan ................................... 280/707

Primary Examiner—Charles A. Marmor
Assistant Examiner—Karin Tyson
Attorney, Agent, or Firm—Evenson, Wands, Edwards, Lenahan & McKeown

[57] ABSTRACT

A control system for stabilizing the rolling of a vehicle, having control elements arranged between vehicle wheel carriers or wheel suspension members and the vehicle body to generate forces approximately in a vertical direction. The control system is activated only when threshold values for the lateral acceleration of the vehicle and for the steering wheel turning angle are exceeded. When the control system is activated, the control elements generate a rolling moment at the vehicle body counteracting the rolling motions caused by driving conditions and at first completely, or for the most part, only at the rear wheel axle. In a transition period, which depends on vehicle parameters, the control system will then change the rolling moment distribution between the front wheel axle and the rear wheel axle to a given fixed rolling moment distribution.

20 Claims, 2 Drawing Sheets

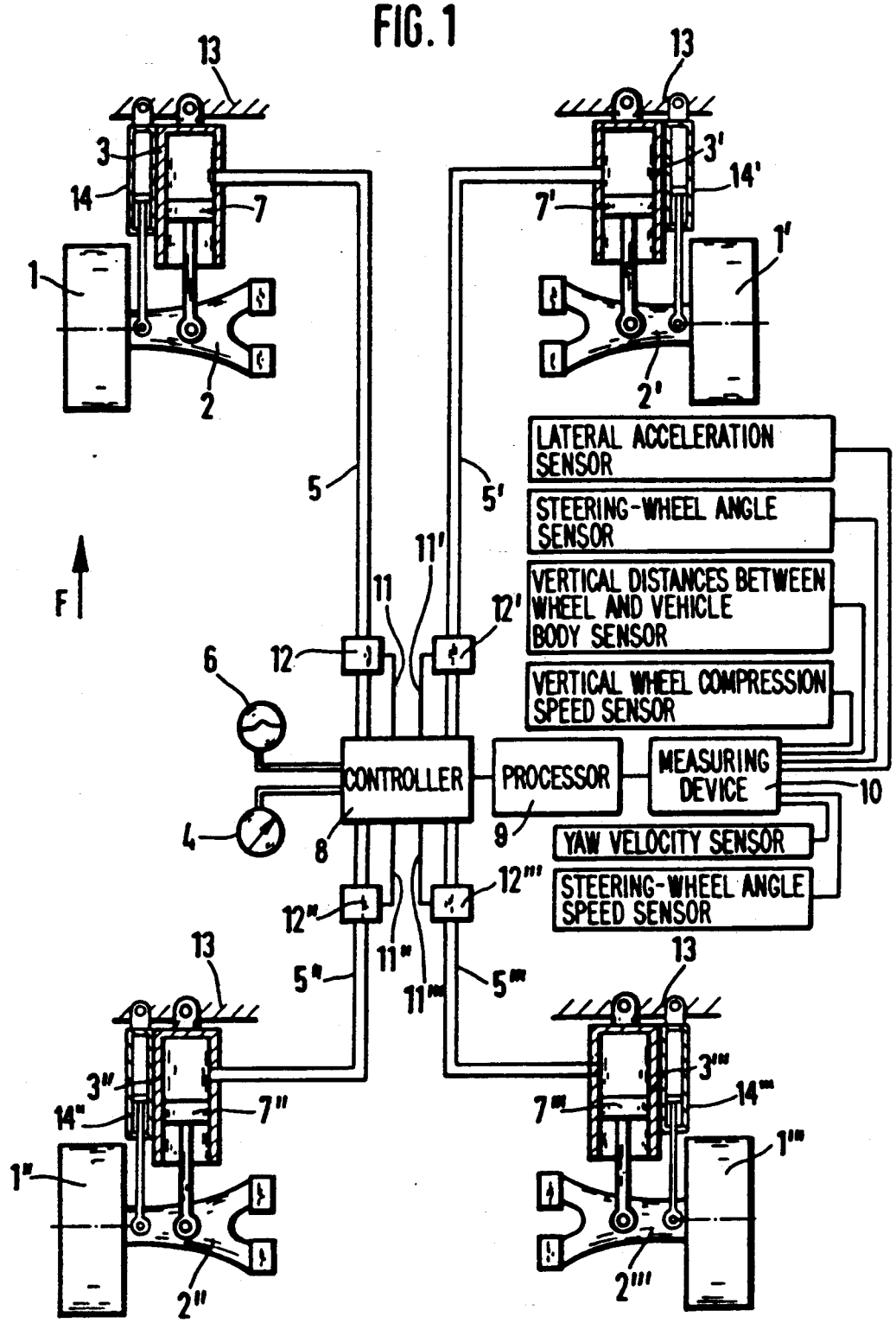

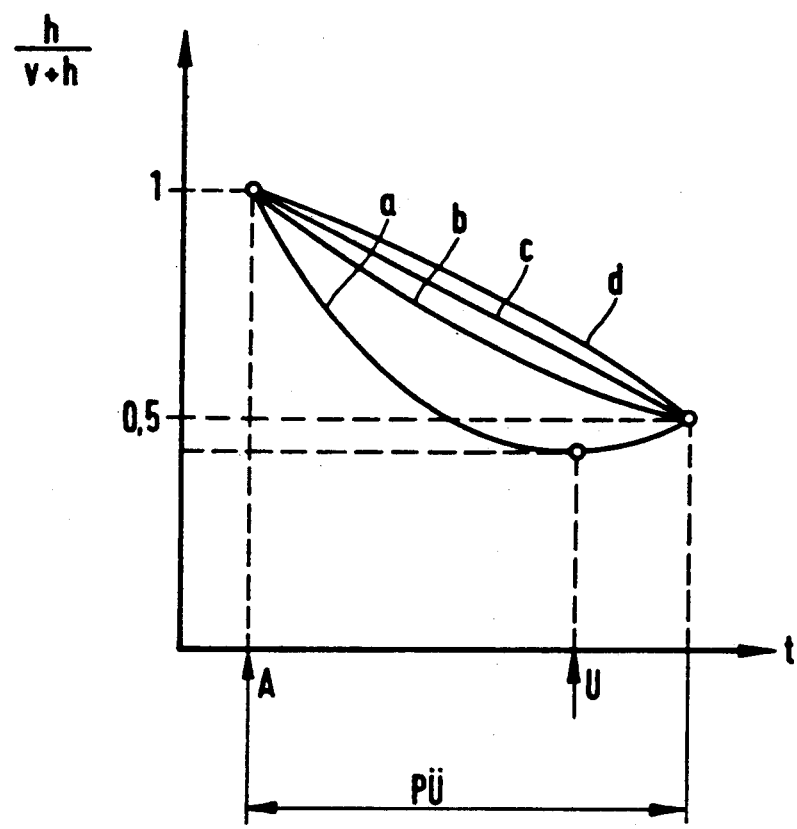

CONTROL SYSTEM FOR STABILIZING THE ROLLING OF A VEHICLE

This is a continuation of application Ser. No. 07/371,730, filed June 27, 1989, abandoned.

BACKGROUND AND SUMMARY OF THE INVENTION

The invention relates to a control system for stabilizing the rolling of a vehicle having control elements which are arranged between the wheel carriers or wheel suspension members and the vehicle body and which generate force approximately in a vertical direction, as a function of: the approximately vertical wheel distances to the vehicle body, the lateral acceleration of the vehicle and the vehicle steering-wheel turning angle, to cause a rolling moment at the vehicle body which counteracts rolling motions on the vehicle due to driving conditions.

From DE-OS 28 44 413, a control device of this general type is known. There the stabilizing of the rolling of a vehicle is provided by hydraulically adjustable spring struts to cause a stabilizing moment which, during cornering, is directed against the cornering tilt of the vehicle body. A lateral acceleration measuring device, arranged at the vehicle, emits signals to a controller which interacts with a microprocessor acting as a disturbance-observing device. By means of the controller, electrohydraulic valves are actuated which cause a corresponding oil supply or oil discharge at the hydraulic spring struts. It is particularly disadvantageous that the respective front and rear spring strut is acted upon by the same pressure. For example, during a fast steering of the vehicle, a high abruptly rising transverse force is caused at the front wheel axle which results in swinging motions of the vehicle about the vertical axis. Swinging motions of this type are connected with fluctuating lateral forces and variable slip angles at the vehicle tires so that vehicle handling becomes unstable.

The invention is based on an object of providing a control system for stabilizing the rolling of a vehicle, having control elements which are arranged between the wheel carriers or wheel suspension members and the vehicle body and which generate force approximately in a vertical direction, as a function of: the approximately vertical wheel distances to the vehicle body, the lateral acceleration of the vehicle and the vehicle steering-wheel turning angle, to cause a rolling moment at the vehicle body which counteracts rolling motions on the vehicle due to driving conditions. This stabilizes the rolling and improves the handling of a vehicle.

This object is achieved when the control system is activated only when threshold values of the lateral acceleration and of the steering-wheel turning angle are exceeded and wherein the rolling moment generated by the control elements after activation, as a function of the approximately vertical wheel distances to the vehicle body, is at first formed completely, or for the most part, by the control elements, at the rear wheel axle. Within a transition period (PÜ), $<->$, the activated control system changes the rolling moment distribution between the front wheel axle and the rear wheel axle, to a given fixed rolling moment distribution, <depending on vehicle parameters>. During straight-ahead driving, the control system is not activated and therefore avoids the diminishing of comfort which is caused on an uneven road by means of known systems for stabilizing the rolling of vehicles. If, for example, at the start of a cornering operation, the threshold values for the lateral acceleration and the steering angle are exceeded, a stabilizing rolling moment is at first caused completely, or for the most part, at the rear wheel axle of the vehicle. By means of such a stabilizing rolling moment, the swinging motions of the vehicle about the vertical axis are largely avoided. Within a transition period, determined by vehicle parameters, the stabilizing rolling moment with a given rolling moment distribution is formed by the control elements of the front wheel axle and of the rear wheel axle. The control system with the variable rolling moment distribution, advantageously improves the roll steer effect of the vehicle and the driving safety by reducing the dynamic wheel load fluctuations during cornering and on an uneven road.

Other advantages are obtained when the vehicle parameters utilize the yaw velocity of the vehicle and the approximately vertical wheel compression speeds or the steering-wheel angle speed.

It is also advantageous if the control elements, after the activation of the control system, maintain the rolling moment distribution between the front wheel axle and the rear wheel axle until the absolute value of the steering angle speed reaches a low value. Also, changes of the rolling moment distribution are carried out in the transition period in such a manner that the rolling moment part generated by the control elements at the vehicle rear wheel axle will decrease and the rolling moment part generated by the control elements at the vehicle front wheel axle will increase. The length of the transition period takes place as a function of the yaw velocity of the vehicle and any one of an approximately vertical wheel compression speeds and a steering-wheel angle speed.

Also during the transition period, the change of the rolling moment distribution, starting from a reverse time (U) is carried out in such a manner that, until the preset rolling moment distribution is reached, the rolling moment part generated by the control at the vehicle rear axle will increase and the rolling moment part generated by the control at the vehicle front wheel axle will decrease.

It is also advantageous if the magnitude of the rolling moment generated by the control elements is also dependent on the steering wheel turning angle and the approximately vertical wheel compression speeds.

It is also desirable if dampers are arranged between the wheel carriers, or the wheel suspension members, and the vehicle body and if they have their damping force increased when the control system is activated.

Other objects, advantages and novel features of the present invention will become apparent from the following detailed description of the invention when considered in conjunction with the accompanying drawings.

BRIEF DESCRIPTION OF THE DRAWINGS

FIG. 1 is a basic diagram of an arrangement of individual elements of the control system; and FIG. 2 is a diagram of a comparison of rolling moment distributions between the front wheel axle and the rear wheel axle in the transition period.

DETAILED DESCRIPTION OF THE DRAWINGS

The control system (in FIG. 1 diagrammatically shown), is provided for stabilizing rolling of a motor vehicle driving forwardly (direction of the arrow F). At each vehicle wheel 1, 1', 1'', 1''', the control system has control elements 3, 3', 3'', 3''' which are hinged at their ends to the wheel carrier or wheel suspension members 2, 2', 2'', 2''' of the respective vehicle wheel 1, 1', 1'', 1''' and to the vehicle body 13. The control elements 3, 3', 3'', 3''' generate forces approximately in a vertical direction. The control elements 3, 3', 3'', 3''' are cylinder/piston units which can be hydraulically acted on by pressure from a compressor 4. However, the control elements may also have a different force-generating effect.

In order to obtain a simple representation, the cylinder piston units are each connected with a respective single line 5, 5', 5'', 5''' which permits a pressure medium supply to the control elements 3, 3', 3'', 3''' and a pressure medium discharge to a pressure accumulator 6. The pistons 7, 7', 7'', 7''', of the control elements 3, 3', 3'', 3''' which can be acted upon by pressure on one side, may also be capable of being acted upon by pressure on both sides. In this case additional lines must be provided, which, for example, lead into a common pressure medium supply or discharge line, by way of valves. The wheel suspensions of the vehicle wheels 1, 1', 1'', 1''', are represented by the wheel suspension elements 2, 2', 2'', 2''' which are constructed as wishbones. Basically, any wheel suspensions that are known may be used.

The control system has a controller 8 which is connected with a processor 9 serving as a disturbance observing device. The processor 9 is connected with a measuring device 10 which supplies signals corresponding to measured vehicle parameter. The measuring device 10 may also be connected directly to the controller 8 as it is not always necessary for a processor 9 to be provided. The controller 8 as shown or, alternatively the processor 9, operates control valves 12, 12', 12'', 12''' by means of corresponding control lines 11, 11', 11'', 11''', in order to achieve a corresponding supply or discharge of pressure medium at the control elements 2, 2', 2'', 2'''. When a valve is in its normal position, the respective line 5, 5', 5'', 5''' is blocked.

The control system is activated when the threshold values detected by the measuring device 10 for the lateral acceleration of the vehicle and for the steering-wheel turning angle are exceeded. In this case, the control elements 3, 3', 3'', 3''', will generate a stabilizing rolling moment which counteracts rolling motions of the vehicle body 13 in the manner to be described. Immediately after the activating of the control system, the stabilizing rolling moment is completely, or for the most part, generated by the control elements 3', 3'' at the rear axle of the vehicle. Subsequently, within a transition period which depends on vehicle parameters, the rolling moment distribution between the front wheel axle and the rear wheel axle is changed to a preset fixed rolling moment distribution by means of the control system. This preset is maintained until there is a falling-below the two threshold values for the lateral acceleration of the vehicle and for the steering-wheel turning angle, at which time the control system switches off. When the control system is activated again, the operation is repeated.

The magnitude of the stabilizing rolling moment generated by the control elements 3, 3', 3'', 3''', depends on the approximately vertical wheel distances to the vehicle body, the steering-wheel turning angle and the approximately vertical wheel compression speeds. The magnitude of the stabilizing rolling moment may also be a function of other parameters or only of the approximately vertical wheel distances to at the vehicle body.

The changing of the rolling moment distribution of the stabilizing rolling moment during the transition period follows the linear course C marked in FIG. 2. In this figure, the time t is entered on the abscissa. The ordinate is the ratio of the rolling moment part h generated at the rear wheel axle to the complete stabilizing rolling moment $v+h$ generated at the front wheel axle and at the rear wheel axle. At the point in time A, activating of the control system causes the complete stabilizing rolling moment to generate only by the control elements at the rear wheel axle. Within a transition period PÜ depending on parameters, the rolling moment distribution is brought to a value of 0.5 by the control system according to the linear course c. After the activating of the control system, the rolling moment part generated by the control elements at the rear wheel axle is therefore reduced and the rolling moment part generated by the control elements at the front wheel axle is increased. With the expiration of the transition period PÜ, the stabilizing rolling moment is equal the control elements of the front wheel axle and on the control elements of the rear wheel axle.

Naturally, after the expiration of the transition period, a different rolling moment distribution may also exist. The change of the rolling moment distribution in the transition period PÜ may also have a nonlinear course which is indicated, for example, by lines a, b, d, or it may have a different irregular course. The rolling moment distribution in the transition period PÜ may depend on the steering-wheel turning angle, the vehicle speed, the vehicle acceleration or deceleration, or on other parameters. If the change of the rolling moment distribution has a course which corresponds to line a, the rolling moment distribution, starting from the reverse time U, takes place in such a manner that the rolling moment part generated by the control elements at the rear wheel axle will increase and the rolling moment part generated by the control elements at the front wheel axle will decrease, until, at the end of the transition period PÜ, the preset fixed rolling moment distribution is reached, or the control system switches off when there is a falling-below the threshold values for the lateral acceleration of the vehicle and for the steering-wheel turning angle.

The length of the transition period depends on the yaw velocity of the vehicle and the approximately vertical wheel compression speeds. The length of the transition period PÜ may just as well also depend on other parameters, such as the steering wheel angle speed. It is also possible that the rolling moment distribution between the front wheel axle and the rear wheel axle, which exists immediately after the activation of the control system, is maintained until the absolute value of the steering angle speed has reached a low value, such as zero. The damping forces of dampers 14, 14', 14'', 14''', which are arranged between the wheel suspension elements 2, 2', 2'', 2''', respectively, and the vehicle body 13 are not shown and are increased when the control system is activated.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A control system for stabilizing the rolling of the vehicle body, comprising: control elements operatively arranged between the wheels and the vehicle body to generate forces approximately in a vertical direction with respect to the vehicle body to cause a rolling moment at the vehicle body which counteracts rolling motions acting on the vehicle body on response to driving conditions; and means for selectively actuating the control system only when threshold values of the vehicle lateral acceleration and of the vehicle steering-wheel turning angle are exceeded such that a magnitude of the rolling moment generated by the control elements, as a function of a first set of parameters comprising the approximately vertical wheel distances to the vehicle body, is at first substantially formed at the rear axle and, after actuation and during a transition period whose time length is determined as a function of a second set of parameters independently of the first set of parameters, the rolling moment distribution between the front-wheel and the rear-wheel axle is changed to a given fixed rolling moment distribution between the front-wheel axle and the rear-wheel axle at the end of the transition period.

2. A control system according to claim 1, wherein the second set of parameters comprise yaw velocity of the vehicle and any one of an approximately vertical wheel compression speeds and a steering-wheel angle speed.

3. A control system according to claim 1, wherein after activation of the control system and after the transition period the control elements means maintain the rolling moment distribution between the front wheel axle and the rear wheel axle until an absolute value of the steering angle speed reaches a low value.

4. A control system according to claim 2, wherein after activation of the control system and after the transition period the control elements means maintain the rolling moment distribution between the front wheel axle and the rear wheel axle until an absolute value of the steering angle speed reaches a low value.

5. A control system according to claim 1, wherein during the transition period the change of the rolling moment distribution is a function of a third set of parameters such that the rolling moment generated by the control elements at the rear wheel axle will decrease and the rolling moment generated by the control element at the front wheel axle will increase.

6. A control system according to claim 2, wherein during the transition period the change of the rolling moment distribution is a function of a third set of parameters such that the rolling moment generated by the control elements at the rear wheel axle will decrease and the rolling moment generated by the control elements at the front wheel axle will increase.

7. A control system according to claim 3, wherein during the transition period the change of the rolling moment distribution is a function of a third set of parameters such that the rolling moment generated by the control elements at the rear wheel axle will decrease and the rolling moment generated by the control elements at the front wheel axle will increase.

8. A control system to claim 4, wherein during the transition period the change of the rolling moment distribution is such that the rolling moment generated by the control elements at the rear wheel axle will decrease and the rolling moment generated by the control elements at the front wheel axle will increase.

9. A control system according to claim 5, wherein the third set of parameters independently of the first and second sets of parameters comprise vehicle steering-wheel turning angle, vehicle speed and vehicle acceleration and deceleration.

10. A control system according to claim 6, wherein the third set of parameters independently of the first and second sets of parameters comprise vehicle steering-wheel turning angle, vehicle speed and vehicle acceleration and deceleration.

11. A control system according to claim 7, wherein the third set of parameters independently of the first and second sets of parameters comprise vehicle steering-wheel turning angle, vehicle speed and vehicle acceleration and deceleration.

12. A control system according to claim 8, wherein the third set of parameters independently of the first and second sets of parameters comprise vehicle steering-wheel turning angle, vehicle speed and vehicle acceleration and deceleration.

13. A control system according to claim 5, wherein at a point in time during the transition period the change of the rolling moment distribution is such that until the given rolling moment distribution is reached at the end of the transition period, the rolling moment generated by the control elements at the rear wheel axle will increase and the rolling moment generated by the control elements at the front wheel axle will decrease.

14. A control system according to claim 9, wherein at a point in time during the transition period the change of the rolling moment distribution is such that until the given rolling moment distribution is reached at the end of the transition period, the rolling moment generated by the control elements at the rear wheel axle will increase and the rolling moment generated by the control elements at the front wheel axle will decrease.

15. A control system according to claim 1, wherein the first set of parameters also comprise vehicle steering wheel turning angle and vertical wheel compression speeds.

16. A control system according to claim 3, wherein the first set of parameters also comprise vehicle steering wheel turning angle and vertical wheel compression speeds.

17. A control system according to claim 5, wherein the first set of parameters also comprise vehicle steering wheel turning angle and vertical wheel compression speeds.

18. A control system according to claim 1, wherein dampers are arranged between one of the wheel carriers and suspension means and the vehicle body, and wherein damping force of the dampers is increased when the control system is activated.

19. A control system according to claim 3, wherein dampers are arranged between one of the wheel carriers and suspension means and the vehicle body, and wherein damping force of the dampers is increased when the control system is activated.

20. A control system according to claim 5, wherein dampers are arranged between one of the wheel carriers and suspension means and the vehicle body, and wherein damping force of the dampers is increased when the control system is activated.

* * * * *